(12) United States Patent
Thompson

(10) Patent No.: US 12,503,702 B1
(45) Date of Patent: Dec. 23, 2025

(54) COMPOSITION FOR REGULATING PRODUCTION OF INTERFERING RIBONUCLEIC ACID

(71) Applicant: Wyvern Pharmaceuticals Inc., Calgary (CA)

(72) Inventor: Bradley G. Thompson, Calgary (CA)

(73) Assignee: Wyvern Pharmaceuticals Inc., Calgary (CA)

( * ) Notice: Subject to any disclaimer, the term of this patent is extended or adjusted under 35 U.S.C. 154(b) by 0 days.

(21) Appl. No.: 18/896,055

(22) Filed: Sep. 25, 2024

(51) Int. Cl.
*C12N 15/113* (2010.01)
*C12N 15/86* (2006.01)

(52) U.S. Cl.
CPC .......... *C12N 15/1138* (2013.01); *C12N 15/86* (2013.01); *C12N 2310/141* (2013.01); *C12N 2750/14143* (2013.01)

(58) Field of Classification Search
CPC ................ C12N 15/1138; C12N 15/86; C12N 2310/141; C12N 2750/14143
See application file for complete search history.

(56) References Cited

U.S. PATENT DOCUMENTS

| | | | |
|---|---|---|---|
| 8,362,232 B2 * | 1/2013 | Bhanot | A61P 9/10 536/24.31 |
| 11,085,055 B2 | 8/2021 | Mallol et al. | |
| 11,162,102 B2 | 11/2021 | Minshull et al. | |
| 11,530,423 B1 | 12/2022 | Thompson | |
| 11,873,505 B2 | 1/2024 | Thompson | |
| 12,018,274 B2 | 6/2024 | Thompson | |
| 12,134,770 B1 | 11/2024 | Thompson | |
| 2024/0026377 A1 | 1/2024 | Thompson | |

FOREIGN PATENT DOCUMENTS

CA 2721333 A1 10/2009

OTHER PUBLICATIONS

Pfeifer, A. and Verma, I.M. "Gene Therapy: Promises and Problems". Annual Reviews in Genomics Human Genetics, vol. 2 (2001), pp. 177-211 (Year: 2001).*
Zhang, X. et al. "MicroRNA-296, a suppressor non-coding RNA, downregulates SGLT2 expression in lung cancer". International Journal of Oncology, vol. 54 (2019), pp. 199-208 (Year: 2019).*
Ren, D. et al. "SGLT2 promotes pancreatic cancer progression by activating the Hippo signaling pathway via the hnRNPK-YAP1 axis". Cancer Letters, vol. 519 (2021), pp. 277-288.. (Year: 2021).*
Supplemental Data pdf—Ren, D. et al. "SGLT2 promotes pancreatic cancer progression by activating the Hippo signaling pathway via the hnRNPK-YAP1 axis". Cancer Letters, vol. 519 (2021), pp. 277-288. (Year: 2021).*
Feng, J. et al. "Pro-angiogenic microRNA-296 upregulates vascular endothelial growth factor and downregulates Notch1 following cerebral ischemic injury". Molecular Medicine Reports, vol. 12, (2015), pp. 8141-8147 (Year: 2015).*
O'Brien, et al. "Overview of MicroRNA Biogenesis, Mechanisms of Actions, and Circulation." Front Endocrinol (Lausanne), (2018) 9:402, p. 1-12. (Year: 2018).*
Gorski, S., Vogel, J. & Doudna, J. "RNA-based recognition and targeting_ sowing the seeds of specificity". Nat Rev Mol Cell Biol 18 (2017), 215-228. (Year: 2017).*
Lam et al. "siRNA Versus miRNA as Therapeutics for Gene Silencing". Molecular Therapy. Nucleic Acids. vol. 4 (2015) pp. e252-e252. (Year: 2015).*
Ying et al."The MicroRNA (miRNA): Overview of the RNA Genes that Modulate Gene Function". Mol. Biotechnol. (2008) 38:257-268. (Year: 2008).*
Van den Berg, et al. "Design of Effective Primary MicroRNA Mimics With Different Basal Stem Conformations". Molecular Therapy—Nucleic Acids, vol. 5 (2016), pp. 1-12. (Year: 2016).*
Denzler R et al."Impact of MicroRNA Levels, Target-Site Complementarity, and Cooperativity on Competing Endogenous RNA-Regulated Gene Expression." Mol Cell. Nov. 3, 2016;64(3):565-579. (Year: 2016).*
Bottoni et al. "Targeting BTK through microRNA in chronic lymphocytic leukemia." Blood, The Journal of the American Society of Hematology 128.26 (2016): 3101-3112.
Christensen et al. "Recombinant adeno-associated virus-mediated microRNA delivery into the postnatal mouse brain reveals a role for miR-134 in dendritogenesis in vivo." Frontiers in neural circuits 3 (2010): 848.
Bofill-De Ros et al. "Guidelines for the optimal design of miRNA-based shRNAs." Methods 103 (2016): 157-166.
Tritschler et al. "Concepts and limitations for learning developmental trajectories from single cell genomics." Development 146.12 (2019): dev170506.
Ahmadzadeh et al. "BRAF mutation in hairy cell leukemia." Oncology reviews 8.2 (2014): 253.
Patton et al. "Biogenesis, delivery, and function of extracellular RNA." Journal of extracellular vesicles 4.1 (2015): 27494.
Clark et al. "Detection of BRAF splicing variants in plasma-derived cell-free nucleic acids and extracellular vesicles of melanoma patients failing targeted therapy therapies." Oncotarget 11.44 (2020): 4016.

(Continued)

*Primary Examiner* — Neil P Hammell
*Assistant Examiner* — Alexandra Geraldine Dace Denito
(74) *Attorney, Agent, or Firm* — Gowling WLG (Canada) LLP

(57) ABSTRACT

The embodiments of the present disclosure relate to one or more compositions or methods that upregulate the production of one or more sequences of micro-interfering ribonucleic acid (miRNA). The sequences of miRNA may be complimentary to a sequence of target messenger RNA (mRNA) that encodes for translation of a target biomolecule, such as SGLT-2. The miRNA can cause the target mRNA to be degraded or inactivated, thereby causing a decrease in bioavailability of the target biomolecule because it is degraded or inactivated by the miRNA. Decreasing the bioavailability of the target biomolecule within a subject that is administered the one or more compositions may address the afflictions experienced by the subject due to expression of the target biomolecule.

3 Claims, No Drawings

Specification includes a Sequence Listing.

(56) References Cited

OTHER PUBLICATIONS

Wang et al. "Adeno-associated virus vector as a platform for gene therapy delivery." Nature reviews Drug discovery 18.5 (2019): 358-378.
Kondratov et al. "Direct head-to-head evaluation of recombinant adeno-associated viral vectors manufactured in human versus insect cells." Molecular Therapy 25.12 (2017): 2661-2675.
Nature (2010. Gene Expression. Scitable. Available online at Nature.com) <https://www.nature.com/scitable/topicpage/gene-expression-14121669> (2010).
Brutons Tyrosine Kinase Genbank Sequence (2023).
GenBank EGFR Sequence (2023).
GenBank EGF Sequence (2023).
NCBI search results for Seq Id No. 5 (2024).
NCBI Nucleotide Sequence ALK Lingand, search performed Dec. 26, 2024 (2023).
NCBI Nucleotide Sequence ALK Receptor, search performed Dec. 26, 2024 (2023).
NCBI Nucleotide Sequence for PARP, search performed Dec. 26, 2024 (2024).
GenBank FLT3 Sequence (2024).

\* cited by examiner

SEQUENCE LISTING

```
Sequence total quantity: 3
SEQ ID NO: 1           moltype = DNA  length = 5807
FEATURE                Location/Qualifiers
source                 1..5807
                       mol_type = other DNA
                       organism = synthetic construct
SEQUENCE: 1
ataatcaacc tctggattac aaaatttgtg aaagattgac tggtattctt aactatgttg   60
ctccttttac gctatgtgga tacgctgctt taatgccttt gtatcatgct attgcttccc  120
gtatggcttt cattttctcc tccttgtata aatcctggtt gctgtctctt tatgaggagt  180
tgtggcccgt tgtcaggcaa cgtggcgtgg tgtgcactgt gtttgctgac gcaaccccca  240
ctggttgggg cattgccacc acctgtcagc tcctttccgg gactttcgct ttccccctcc  300
ctattgccac ggcggaactc atcgccgcct gccttgcccg ctgctggaca ggggctcggc  360
tgttgggcac tgacaattcc gtggtgttgt cggggaaatc atcgtccttt ccttggctgc  420
tcgcctgtgt tgccacctgg attctgcgcg ggacgtcctt ctgctacgtc ccttcggccc  480
tcaatccagc ggaccttcct tcccgcggcc tgctgccggc tctgcggcct cttccgcgtc  540
ttcgccttcg ccctcagacg agtcggatct cccctttggc cgcctccccg cctaagctta  600
tcgataccgt cgagatctaa cttgtttatt gcagcttata atggttacaa ataaagcaat  660
agcatcacaa atttcacaaa taaagcattt ttttcactgc attctagttg tggtttgtcc  720
aaactcatca atgtatctta tcatgtctgg atctcgacct cgactagagc atggctacgt  780
agataagtag catggcgggt taatcattaa ctacaaggaa ccctagtga ttggagttggc  840
cactccctct ctgcgcgctc gctcgctcac tgaggccggg cgaccaaagg tcgcccgacg  900
cccgggcttt gcccgggcgg cctcagtgag cgagcgagcg cgcagctggc gtaatagcga  960
agaggcccgc accgatcgcc cttcccaaca gttgcgcagc ctgaatggcg aatggcgatt 1020
ccgttgcaat ggctggcggt aatattgttc tggatattac cagcaaggcc gatagtttga 1080
gttcttctac tcaggcaagt gatgttatta ctaatcaaag aagtattgcg acaacggtta 1140
```

```
atttgcgtga tggacagact cttttactcg gtggcctcac tgattataaa aacacttctc   1200
aggattctgg cgtaccgttc ctgtctaaaa tccctttaat cggcctcctg tttagctccc   1260
gctctgattc taacgaggaa agcacgttat acgtgctcgt caaagcaacc atagtacgcg   1320
ccctgtagcg gcgcattaag cgcggcgggt gtggtggtta cgcgcagcgt gaccgctaca   1380
cttgccagcg ccctagcgcc cgctcctttc gctttcttcc cttcctttct cgccacgttc   1440
gccggctttc cccgtcaagc tctaaatcgg gggctccctt tagggttccg atttagtgct   1500
ttacggcacc tcgaccccaa aaacttgat tagggtgatg gttcacgtag tgggccatcg   1560
ccctgataga cggttttttcg cccttttgacg ttggagtcca cgttctttaa tagtggactc   1620
ttgttccaaa ctgaacaac actcaaccct atctcggtct attcttttga tttataaggg   1680
attttgccga tttcggccta ttggttaaaa aatgactga tttaacaaaa atttaacgg   1740
aatttttaaca aaatattaac gtttacaatt taaatatttg cttatacaat cttcctgttt   1800
ttggggcttt tctgattatc aaccggggta catatgattg acatgctagt tttacgatta   1860
ccgttcatcg attctcttgt ttgctccaga ctctcaggca atgacctgat agcctttgta   1920
gagacctctc aaaaatagct accctctccg gcatgaattt atcagctaga acggttgaat   1980
atcatattga tggtgatttg actgtctccg gcctttctca cccgtttgaa tctttaccta   2040
cacattactc aggcattgca tttaaaatat atgagggttc taaaaatttt tatccttgcg   2100
ttgaaataaa ggcttctccc gcaaaagtat tacagggtca taatgttttt ggtacaaccg   2160
atttagcttt atgctctgag gctttattgc ttaattttgc taattctttg ccttgcctgt   2220
atgatttatt ggatgttgga attcctgatg cggtattttc tccttacgca tctgtgcggt   2280
atttcacacc gcatatggtg cactctcagt acaatctgct ctgatgccgc atagttaagc   2340
cagccccgac acccgccaac acccgctgac gcgccctgac gggcttgtct gctcccggca   2400
tccgcttaca gacaagctgt gaccgtctcc gggagctgca tgtgtcagag gttttcaccg   2460
tcatcaccga aacgcgcgag acgaaagggc ctcgtgatac gcctattttt ataggttaat   2520
gtcatgataa taatggtttc ttagacgtca ggtggcactt tcggggaaa tgtgcgcgga   2580
acccctattt gtttattttt ctaaatacat tcaaatatgt atccgctcat gagacaataa   2640
ccctgataaa tgcttcaata atattgaaaa aggaagagta tgagtattca acatttccgt   2700
gtcgccctta ttcccttttt tgcggcattt tgccttcctg ttttgctca cccagaaacg   2760
ctggtgaaag taaaagatgc tgaagatcag ttgggtgcac gagtgggtta catcgaactg   2820
gatctcaaca gcggtaagat ccttgagagt tttcgccccg aagaacgttt tccaatgatg   2880
agcactttta aagttctgct atgtggcgcg gtattatccg gtattgacgc cgggcaagag   2940
caactcggtc gccgcataca ctattctcag aatgacttgg ttgagtactc accagtcaca   3000
gaaaagcatc ttacgatgg catgacagta agagaattat gcagtgctgc cataaccatg   3060
agtgataaca ctgcggccaa cttacttctg acaacgatcg gaggaccgaa ggagctaacc   3120
gcttttttgc acaacatggg ggatcatgta actcgttggga atcgttggga accggagctg   3180
aatgaagcca taccaaacga cgagcgtgac accacgatgc ctgtagcaat ggcaacaacg   3240
ttgcgcaaac tattaactgg cgaactactt actctagctt cccggcaaca attaatagac   3300
tggatggagg cggataaagt tgcaggacca cttctgcgct cggcccttcc ggctggctgg   3360
tttattgctg ataaatctgg agccggtgag cgtgggtctc gcggtatcat tgcagcactg   3420
gggccagatg gtaagccctc ccgtatcgta gttatctaca cgacggggag tcaggcaact   3480
atggatgaac gaaatagaca gatcgctgag ataggtgcct cactgattaa gcattggtaa   3540
ctgtcagacc aagtttactc atatatactt tagattgatt taaaacttca ttttttaattt   3600
aaaaggatct aggtgaagat cctttttgat aatctcatga ccaaaatccc ttaacgtgag   3660
ttttcgttcc actgagcgtc agaccccgta gaaaagatca ttgagatcct tgagatctt   3720
tttttttctgc gcgtaatctg ctgcttgcaa acaaaaaaac caccgctacc agcggtggtt   3780
tgtttgccgg atcaagagct accaactctt tttccgaagg taactggctt cagcagagcg   3840
cagataccaa atactgtcct tctagtgtag ccgtagttag gccaccactt caagaactct   3900
gtagcaccgc ctacatacct cgctctgcta atcctgttac cagtggctgc tgccagtggc   3960
gataagtcgt gtcttaccgg gttggactca agacgatagt taccggataa ggcgcagcgg   4020
tcgggctgaa cggggggttc gtgcacacag cccagcttgg agcgaacgac ctacaccgaa   4080
ctgagatacc tacagcgtga gctatgagaa agcgccacgc ttcccgaagg agaaaggcg   4140
gacaggtatc cggtaagcgg cagggtcgga acaggagagc gcacgaggga gcttccaggg   4200
ggaaacgcct ggtatcttta tagtcctgtc gggtttcgcc acctctgact gagcgtcga   4260
ttttttgtgat gctcgtcagg ggggcggagc ctatggaaaa acgccagcaa cgcggccttt   4320
ttacggttcc tggccttttg ctggccttt gctcacatgt tctttcctgc gttatcccct   4380
gattctgtgg ataaccgtat taccgccttt gagtgagctg ataccgctcg ccgcagccga   4440
acgaccgagc gcagcgagtc agtgagcgag gaagcggaag agcgcccaat acgcaaaccg   4500
cctctccccg cgcgttggcc gattcattaa tgcagcagct gcgcgctcgc tcgctcactg   4560
aggccgcccg gcaaagccc gggcgtcggg cgacctttgg tcgcccggcc tcagtgagcg   4620
agcgagcgcg cagagaggga gtggccaact ccatcactag gggttccttg tagttaatga   4680
ttaacccgcc atgctactta tctacgtagc catgctctag gacattgatt attgactagt   4740
ggagttccgc gttacataac ttacggtaaa tggcccgcct ggctgaccgc ccaacgaccc   4800
ccgcccattg acgtcaataa tgacgtatgt tcccatagta acgccaatag ggactttcca   4860
ttgacgtcaa tgggtggagt atttacggta aactgcccac ttggcagtac atcaagtgta   4920
tcatatgcca agtacgcccc ctattgacgt caatgacggt aaatggcccg cctggcatta   4980
tgcccagtac atgaccttat gggactttcc tacttggcag tacatctacg tattagtcat   5040
cgctattacc atggtcgagg tgagcccac gttctgcttc actctcccca tctccccccc   5100
ctccccaccc ccaatttgt atttatttat ttttaatta tttttgtgcag cgatggggggc   5160
ggggggggggg ggggcgcgc gccaggcggg gcggggcggg gcgaggggcg gggcgggcg   5220
aggcggagag gtgcggcgga agccaatcag agccgcgtgc tccgaaagtt tccttttatg   5280
gcgaggcggc ggcggcggcg gcccataaaa aagcgaagcg cgcggcgggc gggagtcgct   5340
gcgcgctgcc ttcgccccgt gcccgctccg ccgcgcgcct cgccgccgcc gccccggctc   5400
tgactgaccg cgttactaaa acaggtaagt ccggcctccg cgccgggttt tggcgcctcc   5460
cgcgggcgcc cccctcctca cggcgagcgc tgccacgtca gacgaagggc gcagcgagcg   5520
tcctgatcct ccgccccgga cgctcaggac agcggcccgc tgctcataag actcggcctt   5580
agaaccccag tatcagcaga aggacatttt aggacgggac ttgggtgact ctagggcact   5640
ggttttctttt ccagagagcg gaacaggcga ggaaaagtag tcccttctcg gcgattctgc   5700
ggagggatct ccgtggggcg gtgaacgccg atgatgcctc tactaaccat gttcatgttt   5760
tctttttttt tctacaggtc ctgggtgacg aacagggtac cgccacc                 5807
```

```
SEQ ID NO: 2               moltype = DNA   length = 526
FEATURE                    Location/Qualifiers
source                     1..526
                           mol_type = other DNA
                           organism = synthetic construct
SEQUENCE: 2
atggccaccg gctctcgcac aagcctgctg ctggctttcg gactgctgtg cctgccttgg   60
ctccaggagg gctccgccgc tagcatcgat accgtcgcta tgtgctggag gcttgctgaa  120
ggctgtatgc tgatactgcg gcatgtggta atcacgtttt ggcctctgac tgacgtgatt  180
accatgccgc agtatcagga cacaaggcct gttactagca ctcacatgga acaaatggcc  240
tctagcctgg aggcttgctg aaggctgtat gctggcgctg ggctgatgaa catttatgtt  300
ttggcctctg actgacgcgc tgggctggaa catttatcag gacacaaggc ctgttactag  360
cactcacatg gaacaaatgg cctctagcct ggaggcttgc tgaaggctgt atgctgtcat  420
gaaacgcaaa tagcccatcg ttttggcctc tgactgacga tgggctatgc gtttcatgac  480
aggacacaag gcctgttact agcactcaca tggaacaaat ggcctc              526

SEQ ID NO: 3               moltype = DNA   length = 6333
FEATURE                    Location/Qualifiers
source                     1..6333
                           mol_type = other DNA
                           organism = synthetic construct
SEQUENCE: 3
ataatcaacc tctggattac aaaatttgtg aaagattgac tggtattctt aactatgttg   60
ctccttttac gctatgtgga tacgctgctt taatgccttt gtatcatgct attgcttccc  120
gtatggcttt catttctcc tccttgtata aatcctggtt gctgtctctt tatgaggagt  180
tgtggcccgt tgtcaggcaa cgtggcgtgg tgtgcactgt gtttgctgac gcaaccccca  240
ctggttgggg cattgccacc acctgtcagc tcctttccgg gactttcgct ttccccctcc  300
ctattgccac ggcggaactc atcgccgcct gccttgcccg ctgctggaca ggggctcggc  360
tgttgggcac tgacaattcc gtggtgttgt cggggaaatc atcgtccttt ccttggctgc  420
tcgcctgtgt tgccacctgg attctgcgcg gaacgtctc cttcggccc               480
tcaatccagc ggaccttcct tcccgcggcc tgctgccgc tctgcggcct cttccgcgtc   540
ttcgccttcg ccctcagacg agtcggatct cctttgggc cgcctcccg cctaagctta    600
tcgataccgt cgagatctaa cttgtttatt gcagcttata atggttacaa ataaagcaat  660
agcatcacaa atttcacaaa taaagcattt ttttcactgc attctagttg tggtttgtcc  720
aaactcatca atgtatctta tcatgtctgt atctcgacct cgactagagc atggctacgt  780
agataagtag catggcgggt taatcattaa ctacaaggaa ccctagtga tggagttggc   840
cactccctct ctgcgcgctc gctcgctcac tgaggccggg cgaccaaagg tcgcccgacg  900
cccgggcttt gcccggcgg cctcagtgag cgagcgagcg cgcagctggc gtaatagcga  960
agaggcccgc accgatcgcc cttcccaaca gttgcgcagc ctgaatggcg aatggcgatt 1020
ccgttgcaat ggctggcggt aatattgttc tggatattac cagcaaggcc gatagtttga 1080
gttcttctac tcaggcaagt gatgttatta ctaatcaaag aagtattgcg acaacggtta 1140
atttgcgtga tggacagact cttttactcg gtggcctcac tgattataaa aacacttctc 1200
aggattctgg cgtaccgttc ctgtctaaaa tccctttaat cggcctcctg tttagctccc 1260
gctctgattc taacgaggaa agcacgttat acgtgctcgt caaagcaacc atagtacgcg 1320
ccctgtagcg cgcgcattaag cgcggcgggt gtggtggtta cgcgcagcgt gaccgctaca 1380
cttgccagcg ccctagcgcc cgctcctttc gctttcttcc cttcctttct cgccacgttc 1440
gccgctttc cccgtcaagc tctaaatcgg gggctccctt tagggttccg atttagtgct 1500
ttacggcacc tcgacccaa aaaacttgat tagggtgatg gttcacgtag tgggccatcg 1560
ccctgataga cggttttttcg ccctttgacg ttggagtcca cgttctttaa tagtggactc 1620
ttgttccaaa ctggaacaac actcaaccct atctcggtct attctttga tttataaggg 1680
attttgccga tttcggccta ttggttaaaa aatgagctga tttaacaaaa atttaacgcg 1740
aattttaaca aaatattaac gtttacaatt taaatatttg cttatacaat cttcctgttt 1800
ttggggcttt tctgattatc aaccggggta catatgattg acatgctagt tttacgatta 1860
ccgttcatcg attctcttgt ttgctccaga ctctcaggca atgacctgat agcctttgta 1920
gagacctctc aaaaatagct accctctccg gcatgaattt atcagctaga acggttgaat 1980
atcatattga tggtgatttg actgtctccg gcctttctca cccgtttgaa tctttaccta 2040
cacattactc aggcattgca tttaaaatat atgagggttc taaaaatttt tatccttgcg 2100
ttgaaataaa ggcttctccc gcaaaagtat tacagggtca taatgttttt ggtacaaccg 2160
atttagcttt atgctctgag gctttattgc ttaattttgc taattctttg ccttgcctgt 2220
atgatttatt ggatgttgga attcctgatg cggtattttc tccttacgca tctgtgcggt 2280
atttcacacc gcatatggtg cactctcagt acaatctgct ctgatgccgc atagttaagc 2340
cagcccgac acccgccaac acccgctgac gcgccctgac gggcttgtct gctcccggca 2400
tccgcttaca gacaagctgt gaccgtctcc gggagctgca tgtgtcagag gttttcaccg 2460
tcatcaccga aacgcgagag acgaaagggc ctcgtgatac gcctattttt ataggttaat 2520
gtcatgataa taatggtttc ttagacgtca ggtggcactt ttcggggaaa tgtgcgcgga 2580
acccctattt gtttatttt ctaaatacat tcaaatatgt atccgctcat gagacaataa 2640
ccctgataaa tgcttcaata atattgaaaa aggaagagta tgagtattca acatttccgt 2700
gtcgccctta ttccctttt tgcggcatt tgccttcctg ttttttgctca cccagaaacg 2760
ctggtgaaag taaaagatgc tgaagatcag ttgggtgcac gagtgggtta catcgaactg 2820
gatctcaaca gcggtaagat ccttgagagt tttcgccccg aagaacgttt tccaatgatg 2880
agcactttta aagttctgct atgtggcgcg gtattatccc gtattgacgc cgggcaagag 2940
caactcggtc gccgcataca ctattctcag aatgacttgg ttgagtactc accagtcaca 3000
gaaaagcatc ttacggatgg catgacagta agagaattat gcagtgctgc cataaccatg 3060
agtgataaca ctgcggccaa cttacttctg acaacgatcg gaggaccgaa ggagctaacc 3120
gcttttttgc acaacatggg ggatcatgta actcgccttg atcgttggga accggagctg 3180
aatgaagcca taccaaacga cgagcgtgac accacgatgc ctgtagcaat ggcaacaacg 3240
ttgcgcaaac tattaactgg cgaactactt actctagctt cccggcaaca attaatagac 3300
tggatggagg cggataaagt tgcaggacca cttctgcgct cggcccttcc ggctggctgg 3360
tttattgctg ataaatctgg agccggtgag cgtgggtctc gcggtatcat tgcagcactg 3420
```

```
gggccagatg gtaagccctc ccgtatcgta gttatctaca cgacggggag tcaggcaact 3480
atggatgaac gaaatagaca gatcgctgag ataggtgcct cactgattaa gcattggtaa 3540
ctgtcagacc aagtttactc atatatactt tagattgatt taaaacttca tttttaattt 3600
aaaaggatct aggtgaagat ccttttgat aatctcatga ccaaaatccc ttaacgtgag 3660
ttttcgttcc actgagcgtc agacccgta gaaaagatca aaggatcttc ttgagatcct 3720
ttttttctgc gcgtaatctg ctgcttgcaa acaaaaaaac caccgctacc agcggtggtt 3780
tgtttgccgg atcaagagct accaactctt tttccgaagg taactggctt cagcagagcg 3840
cagataccaa atactgtcct tctagtgtag ccgtagttag gccaccactt caagaactct 3900
gtagcaccgc ctacatacct cgctctgcta atcctgttac cagtggctgc tgccagtggc 3960
gataagtcgt gtcttaccgg gttggactca agacgatagt taccggataa ggcgcagcgg 4020
tcgggctgaa cggggggttc gtgcacacag cccagcttgg agcgaacgac ctacaccgaa 4080
ctgagatacc tacagcgtga gctatgagaa agcgccacgc ttcccgaagg gagaaaggcg 4140
gacaggtatc cggtaagcgg cagggtcgga acaggagagc gcacgaggga gcttccaggg 4200
ggaaacgcct ggtatcttta tagtcctgtc gggtttcgcc acctctgact tgagcgtcga 4260
tttttgtgat gctcgtcagg ggggcggagc ctatggaaaa acgccagcaa cgcggccttt 4320
ttacggttcc tggccttttg ctggcctttt gctcacatgt tctttcctgc gttatcccct 4380
gattctgtgg ataaccgtat taccgccttt gagtgagctg ataccgctcg ccgcagccga 4440
acgaccgagc gcagcgagtc agtgagcgag gaagcggaag ggcgcccaat acgcaaaccg 4500
cctctccccg cgcgttggcc gattcattaa tgcagcagct gcgcgctcgc tcgctcactg 4560
aggccgcccg ggcaaagccc gggcgtcggg cgacctttgg tcgcccggcc tcagtgagcg 4620
agcgagcgcg cagagaggga gtggccaact ccatcactag gggttccttg tagttaatga 4680
ttaacccgcc atgctactta tctacgtagc catgctctag gacattgatt attgactagt 4740
ggagttccgc gttacataac ttacggtaaa tggcccgcct ggctgaccgc ccaacgaccc 4800
ccgcccattg acgtcaataa tgacgtatgt tcccatagta acgccaatag ggactttcca 4860
ttgacgtcaa tgggtggagt atttacggta aactgcccac ttggcagtac atcaagtgta 4920
tcatatgcca agtacgcccc ctattgacgt caatgacggt aaatggcccg cctggcatta 4980
tgcccagtac atgaccttat gggactttcc tacttggcag tacatctacg tattagtcat 5040
cgctattacc atggtcgagg tgagcccac gttctgcttc actctcccca tctccccccc 5100
ctccccaccc ccaatttgt atttatttat tttttaatta ttttgtgcag cgatgggggc 5160
gggggggggg ggggcgcgc gccaggcggg gcggggcggg gcgaggggcg gggcggggcg 5220
aggcggagag gtgcggcggc agccaatcag agcggcgcgc tccgaaagtt tccttttatg 5280
gcgaggcggc ggcggcggcg gcccatataaa aagcgaagcg cgcggcgggc gggagtcgct 5340
gcgcgctgcc ttcgccccgt gccccgctcc gccgccgcct cgcgccgccc gccccggctc 5400
tgactgaccg cgttactaaa acaggtaagt ccggcctccg cgccgggttt tggcgcctcc 5460
cgcgggcgcc cccctcctca cggcgagcgc tgccacgtca gacgaagggc gcagcgagcg 5520
tcctgatcct tccgcccgga cgctcaggac agcggcccgc tgctcataag actcggcctt 5580
agaaccccag tatcagcaga aggacatttt aggacgggac ttgggtgact ctagggcact 5640
ggttttcttt ccagagagcg gaacaggcga ggaaaagtag tcccttctcg gcgattctgc 5700
ggagggatct ccgtggggcg gtgaacgccg atgatgcctc tactaaccat gttcatgttt 5760
tcttttttt tctacaggtc ctgggtgacg aacagggtac cgccaccatg gccaccggct 5820
ctcgcacaag cctgctgctg gctttcggac tgctgtgcct gccttggctc caggagggct 5880
ccgccgctag catcgatacc gtcgctatgt gctggaggct tgctgaaggc tgtatgctga 5940
tactgcggca tgtggtaatc acgttttggc ctctgactga cgtgattacc atgccgcagt 6000
atcaggacac aaggcctgtt actagcactc acatgaaca aatggcctct agcctggagg 6060
cttgctgaag gctgtatgct ggcgctgggc tgatgaacat ttatgttttg gcctctgact 6120
gacgcgctgg gctggaacat ttatcaggac acaaggcctg ttactagcac tcacatgaa 6180
caaatggcct ctagcctgga ggcttgctga aggctgtatg ctgtcatgaa acgcaaatag 6240
cccatcgttt tggcctctga ctgacgatgg gctatgcgtt tcatgacagg acacaaggcc 6300
tgttactagc actcacatgg aacaaatggc ctc                            6333
```

COMPOSITION FOR REGULATING PRODUCTION OF INTERFERING RIBONUCLEIC ACID

This application contains a Sequence Listing electronically submitted via Patent Center to the United States Patent and Trademark Office as an XML Document file entitled "A8149836US-SequenceListing.xml" created on 2024 Sep. 19 and having a size of 15,902 bytes. The information contained in the Sequence Listing is incorporated by reference herein.

TECHNICAL FIELD

The present disclosure generally relates to compositions for regulating production of micro-interfering ribonucleic acid (miRNA). In particular, the present disclosure relates to compositions for regulating gene expression and, therefore, the production of miRNA that suppresses sodium/glucose cotransporter 2 (SGLT-2) expression.

BACKGROUND

Bioactive molecules, including receptors, are necessary for the homeostatic control of biological systems.

When bioactive molecules are over-expressed or mis-expressed, homeostasis is lost, and disease is often the result.

As such, it may be desirable to establish therapies, treatments and/or interventions that address the loss of homeostasis and regulation of bioactive molecules in order to prevent or treat the resulting disease.

SUMMARY

Some embodiments of the present disclosure relate to one or more compositions that upregulate the production of one or more sequences of micro-interfering ribonucleic acid (miRNA). The sequences of miRNA may be complimentary to a sequence of target messenger RNA (mRNA) that encodes for translation of a target biomolecule and the miRNA can cause the mRNA of the target biomolecule, also referred to as target mRNA, to be degraded or inactivated, thereby causing a decrease in bioavailability of the target biomolecule within a subject that is administered the one or more compositions. In some embodiments of the present disclosure, the target biomolecule is a sodium-dependent glucose transport protein such as a sodium/glucose cotransporter 2 (SGLT-2). In some embodiments of the present disclosure, the target biomolecule participates, directly or indirectly, in the reabsorption of glucose in the kidney.

In some embodiments of the present disclosure the compositions comprise a plasmid of deoxyribonucleic acid (DNA) that includes one or more insert sequences of nucleotides that encode for the production of miRNA and a backbone sequence of nucleic acids that facilitates introduction of the one or more insert sequences into one or more of a subject's cells where it is expressed and/or replicated. Expression of the one or more insert sequences by one or more cells of the subject results in an increased production of the miRNA and, therefore, decreased translation or production of the target biomolecule by one or more of the subject's cells.

Some embodiments of the present disclosure relate to compositions that upregulate the production of miRNA that degrades, or causes degradation of, or inactivates, or causes the inactivation of, the target mRNA of the target biomolecule.

Some embodiments of the present disclosure relate to a composition that comprises a recombinant plasmid (RP). In some embodiments of the present disclosure, the RP comprises a nucleotide sequence of SEQ ID NO. 1 and SEQ ID NO. 2. The RP comprises a nucleotide sequence encoding one or more nucleotide sequences encoding a miRNA sequence that targets the mRNA of sodium/glucose cotransporter 2 (SGLT-2).

Some embodiments of the present disclosure relate to a method of making a composition/target cell complex. The method comprises a step of administering an RP comprising SEQ ID NO. 1 and SEQ ID NO. 2 to a target cell for forming the composition/target cell complex, wherein the composition/target cell complex causes the target cell to increase production of one or more sequences of miRNA that decreases production of a target biomolecule.

Embodiments of the present disclosure relate to at least one approach for inducing endogenous production of one or more sequences of miRNA that target and silence the mRNA of a target biomolecule, for example SGLT-2. A first approach utilizes gene vectors containing nucleotide sequences for increasing the endogenous production of one or more sequences of miRNA, which are complete or partial sequences and/or combinations thereof, that target and silence the mRNA of SGLT-2, which can be administered to a subject to increase the subject's production of one or more sequences of the miRNA.

DETAILED DESCRIPTION

Unless defined otherwise, all technical and scientific terms used therein have the meanings that would be commonly understood by one of skill in the art in the context of the present description. Although any methods and materials similar or equivalent to those described therein can also be used in the practice or testing of the present disclosure, the preferred methods and materials are now described. All publications mentioned therein are incorporated therein by reference to disclose and describe the methods and/or materials in connection with which the publications are cited.

As used therein, the singular forms "a", "an", and "the" include plural references unless the context clearly dictates otherwise. For example, reference to "a composition" includes one or more compositions and reference to "a subject" or "the subject" includes one or more subjects.

As used therein, the terms "about" or "approximately" refer to within about 25%, preferably within about 20%, preferably within about 15%, preferably within about 10%, preferably within about 5% of a given value or range. It is understood that such a variation is always included in any given value provided therein, whether or not it is specifically referred to.

As used therein, the term "ameliorate" refers to improve and/or to make better and/or to make more satisfactory.

As used therein, the term "cell" refers to a single cell as well as a plurality of cells or a population of the same cell type or different cell types. Administering a composition to a cell includes in vivo, in vitro and ex vivo administrations and/or combinations thereof.

As used therein, the term "complex" refers to an association, either direct or indirect, between one or more particles of a composition and one or more target cells. This association results in a change in the metabolism of the target cell. As used therein, the phrase "change in metabolism" refers to an increase or a decrease in the one or more target cells' production of one or more proteins, and/or any post-translational modifications of one or more proteins.

As used therein, the term "composition" refers to a substance that, when administered to a subject, causes one or more chemical reactions and/or one or more physical reactions and/or one or more physiological reactions and/or one or more immunological reactions in the subject. In some embodiments of the present disclosure, the composition is a plasmid vector.

As used therein, the term "endogenous" refers to the production and/or modification of a molecule that originates within a subject.

As used therein, the term "exogenous" refers to a molecule that is within a subject but that did not originate within the subject. As used therein, the terms "production", "producing" and "produce" refer to the synthesis and/or replication of DNA, the transcription of one or more sequences of RNA, the translation of one or more amino acid sequences, the post-translational modifications of an amino acid sequence, and/or the production of one or more regulatory molecules that can influence the production and/or functionality of an effector molecule or an effector cell. For clarity, "production" is also used therein to refer to the functionality of a regulatory molecule, unless the context reasonably indicates otherwise.

As used therein, the term "subject" refers to any therapeutic target that receives the composition. The subject can be a vertebrate, for example, a mammal including a human. The term "subject" does not denote a particular age or sex. The term "subject" also refers to one or more cells of an organism, an in vitro culture of one or more tissue types, an in vitro culture of one or more cell types, ex vivo preparations, and/or a sample of biological materials such as tissue and/or biological fluids.

As used therein, the term "target biomolecule" refers to a sodium-dependent glucose transport protein that is found within a subject, such as sodium/glucose cotransporter 2 (SGLT-2). A biomolecule may be endogenous or exogenous to a subject and, when bioavailable, the biomolecule may enhance glucose reabsorption in the kidney.

As used therein, the term "target cell" refers to one or more cells and/or cell types that are deleteriously affected, either directly or indirectly, by a dysregulated biomolecule. The term "target cell" also refers to cells that are not deleteriously affected but that are cells in which it is desired that the composition interacts.

As used therein, the term "therapeutically effective amount" refers to the amount of the composition used that is of sufficient quantity to ameliorate, treat and/or inhibit one or more of a disease, disorder or a symptom thereof. The "therapeutically effective amount" will vary depending on the composition used, the route of administration of the composition and the severity of the disease, disorder or symptom thereof. The subject's age, weight and genetic make-up may also influence the amount of the composition that will be a therapeutically effective amount.

As used therein, the terms "treat", "treatment" and "treating" refer to obtaining a desired pharmacologic and/or physiologic effect. The effect may be prophylactic in terms of completely or partially preventing an occurrence of a disease, disorder or symptom thereof and/or the effect may be therapeutic in providing a partial or complete amelioration or inhibition of a disease, disorder, or symptom thereof. Additionally, the term "treatment" refers to any treatment of a disease, disorder, or symptom thereof in a subject and includes: (a) preventing the disease from occurring in a subject which may be predisposed to the disease but has not yet been diagnosed as having it; (b) inhibiting the disease, i.e., arresting its development; and (c) ameliorating the disease.

As used therein, the terms "unit dosage form" and "unit dose" refer to a physically discrete unit that is suitable as a unitary dose for patients. Each unit contains a predetermined quantity of the composition and optionally, one or more suitable pharmaceutically acceptable carriers, one or more excipients, one or more additional active ingredients, or combinations thereof. The amount of composition within each unit is a therapeutically effective amount.

Where a range of values is provided therein, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges, and are also, encompassed within the disclosure, subject to any specifically excluded limit in the stated range. Where the stated range includes one or both of the limits, ranges excluding either or both of those included limits are also included in the disclosure.

In some embodiments of the present disclosure, the composition is a recombinant plasmid (RP) for introducing genetic material, such as one or more nucleotide sequences, into a target cell for reproduction or transcription of an insert that comprises one or more nucleotide sequences that are carried within the RP. In some embodiments of the present disclosure, the RP is delivered without a carrier, by a viral vector, by a protein coat, or by a lipid vesicle. In some embodiments of the present disclosure, the vector is an adeno-associated virus (AAV) vector.

In some embodiments of the present disclosure, the insert comprises one or more nucleotide sequences that encode for production of at least one sequence of miRNA that decreases the production and/or activation of one or more target biomolecules. The miRNA may, directly or indirectly, bind to and degrade the mRNA of the target biomolecule, also referred to as the target mRNA, or otherwise inactivate the target mRNA so that less or none of the target biomolecule protein is produced.

In some embodiments of the present disclosure, the target biomolecule is SGLT-2.

In some embodiments of the present disclosure, the insert comprises one or more nucleotide sequences that each encode one or more miRNA sequences that may be complimentary to and degrade, or cause degradation and/or inactivation of, mRNA of the target biomolecule.

Some embodiments of the present disclosure relate to a composition that can be administered to a subject with a condition that results, directly or indirectly, from the production of a dysregulated biomolecule. When a therapeutically effective amount of the composition is administered to the subject, the subject may change production and/or functionality of one or more biomolecules.

In some embodiments of the present disclosure, the subject may respond to receiving the therapeutic amount of the composition by changing the production and/or functionality of one or more intermediary molecules by changing the production of one or more DNA sequences, one or more RNA sequences, and/or one or more proteins that regulate the levels and/or functionality of the one or more intermediary molecules. The one or more intermediary molecules regulate the subject's levels and/or functionality of the one or more biomolecules.

In some embodiments of the present disclosure, administering a therapeutic amount of the composition to a subject upregulates the production, functionality or both of one or more sequences of miRNA that each target the mRNA of one or more target biomolecules. In some embodiments of the present disclosure, there are one, two, three, four, five, or six miRNA sequences that each are complimentary to and degrade, or cause degradation of, a biomolecule, such as SGLT-2. In some embodiments of the present disclosure, the composition may comprise multiple copies of the same nucleotide sequence of miRNA.

In some embodiments of the present disclosure, the composition is an RP that may be used for gene therapy. The gene therapy is useful for increasing the subject's endogenous production of one or more sequences of miRNA that target the mRNA of a target biomolecule. For example, the RP can contain one or more nucleotide sequences that cause increased production of one or more nucleotide sequences that cause an increased production of one or more miRNA sequences that are each complimentary to and degrade, or cause degradation of, or inactivate, or cause inactivation of, a biomolecule, such as SGLT-2.

In some embodiments of the present disclosure, the delivery vehicle of the RP used for gene therapy may be a virus that can be enveloped or not (unenveloped), replication effective or not (replication ineffective), or combinations thereof. In some embodiments of the present disclosure, the vector is a virus that is not enveloped and not replication effective. In some embodiments of the present disclosure, the vector is a virus of the Parvoviridae family. In some embodiments of the present disclosure, the vector is a virus of the genus Dependoparvovirus. In some embodiments of the present disclosure, the vector is an adeno-associated virus (AAV). In some embodiments of the present disclosure, the vector is a recombinant AAV. In some embodiments of the present disclosure, the vector is a recombinant AAV6.2FF.

In some embodiments of the present disclosure, the delivery vehicle of the RP used for gene therapy may be a protein coat.

In some embodiments of the present disclosure, the delivery vehicle of the RP used for gene therapy may be a lipid vesicle.

The embodiments of the present disclosure also relate to administering a therapeutically effective amount of the composition. In some embodiments of the present disclosure, the therapeutically effective amount of the composition that is administered to a patient is between about 10 and about $1 \times 10^{16}$ TCID$_{50}$/kg (50% tissue culture infective dose per kilogram of the patient's body mass). In some embodiments of the present disclosure, the therapeutically effective amount of the composition that is administered to the patient is about $1 \times 10^{13}$ TCID$_{50}$/kg. In some embodiments of the present disclosure, the therapeutically effective amount of the composition that is administered to a patient is measured in TPC/kg (total particle count of the composition per kilogram of the patient's body mass). In some embodiments the therapeutically effective amount of the composition is between about 10 and about $1 \times 10^{16}$ TCP/kg.

Some embodiments of the present disclosure relate to an adeno-associated virus (AAV) genome consisting of an RP that, when operable inside a target cell, will cause the target cell to produce a miRNA sequence that downregulates production of a biomolecule, with an example being SGLT-2. The RP is comprised of AAV2 inverted terminal repeats (ITRs), a composite CASI promoter, a human growth hormone (HGH) signal peptide followed by a miRNA expression cassette containing up to six different miRNAs targeting SGLT-2, followed by a Woodchuck Hepatitis Virus post-transcriptional regulatory element (WPRE) and an SV40 polyA signal.

```
SEQ ID NO. 1 (backbone sequence No. 1):
5'

ATAATCAACCTCTGGATTACAAAATTTGTGAAAGATTGACTGGTATTCTTAACTATG

TTGCTCCTTTTACGCTATGTGGATACGCTGCTTTAATGCCTTTGTATCATGCTATTGCT

TCCCGTATGGCTTTCATTTTCTCCTCCTTGTATAAATCCTGGTTGCTGTCTCTTTATGA

GGAGTTGTGGCCCGTTGTCAGGCAACGTGGCGTGGTGTGCACTGTGTTTGCTGACGC

AACCCCCACTGGTTGGGGCATTGCCACCACCTGTCAGCTCCTTTCCGGGACTTTCGC

TTTCCCCCTCCCTATTGCCACGGCGGAACTCATCGCCGCCTGCCTTGCCCGCTGCTGG

ACAGGGGCTCGGCTGTTGGGCACTGACAATTCCGTGGTGTTGTCGGGGAAATCATCG

TCCTTTCCTTGGCTGCTCGCCTGTGTTGCCACCTGGATTCTGCGCGGGACGTCCTTCT

GCTACGTCCCTTCGGCCCTCAATCCAGCGGACCTTCCTTCCCGCGGCCTGCTGCCGG

CTCTGCGGCCTCTTCCGCGTCTTCGCCTTCGCCCTCAGACGAGTCGGATCTCCCTTTG

GGCCGCCTCCCCGCCTAAGCTTATCGATACCGTCGAGATCTAACTTGTTTATTGCAG

CTTATAATGGTTACAAATAAAGCAATAGCATCACAAATTTCACAAATAAAGCATTTT

TTTCACTGCATTCTAGTTGTGGTTTGTCCAAACTCATCAATGTATCTTATCATGTCTG

GATCTCGACCTCGACTAGAGCATGGCTACGTAGATAAGTAGCATGGCGGGTTAATC

ATTAACTACAAGGAACCCCTAGTGATGGAGTTGGCCACTCCCTCTCTGCGCGCTCGC

TCGCTCACTGAGGCCGGGCGACCAAAGGTCGCCCGACGCCCGGGCTTTGCCCGGGC

GGCCTCAGTGAGCGAGCGAGCGCGCAGCTGGCGTAATAGCGAAGAGGCCCGCACCG
```

-continued

```
ATCGCCCTTCCCAACAGTTGCGCAGCCTGAATGGCGAATGGCGATTCCGTTGCAATG
GCTGGCGGTAATATTGTTCTGGATATTACCAGCAAGGCCGATAGTTTGAGTTCTTCT
ACTCAGGCAAGTGATGTTATTACTAATCAAAGAAGTATTGCGACAACGGTTAATTTG
CGTGATGGACAGACTCTTTTACTCGGTGGCCTCACTGATTATAAAAACACTTCTCAG
GATTCTGGCGTACCGTTCCTGTCTAAAATCCCTTTAATCGGCCTCCTGTTTAGCTCCC
GCTCTGATTCTAACGAGGAAAGCACGTTATACGTGCTCGTCAAAGCAACCATAGTAC
GCGCCCTGTAGCGGCGCATTAAGCGCGGCGGGTGTGGTGGTTACGCGCAGCGTGAC
CGCTACACTTGCCAGCGCCCTAGCGCCCGCTCCTTTCGCTTTCTTCCCTTCCTTTCTC
GCCACGTTCGCCGGCTTTCCCCGTCAAGCTCTAAATCGGGGGCTCCCTTTAGGGTTC
CGATTTAGTGCTTTACGGCACCTCGACCCCAAAAAACTTGATTAGGGTGATGGTTCA
CGTAGTGGGCCATCGCCCTGATAGACGGTTTTTCGCCCTTTGACGTTGGAGTCCACG
TTCTTTAATAGTGGACTCTTGTTCCAAACTGGAACAACACTCAACCCTATCTCGGTCT
ATTCTTTTGATTTATAAGGGATTTTGCCGATTTCGGCCTATTGGTTAAAAAATGAGCT
GATTTAACAAAAATTTAACGCGAATTTTAACAAAATATTAACGTTTACAATTTAAAT
ATTTGCTTATACAATCTTCCTGTTTTTGGGGCTTTTCTGATTATCAACCGGGGTACAT
ATGATTGACATGCTAGTTTTACGATTACCGTTCATCGATTCTCTTGTTTGCTCCAGAC
TCTCAGGCAATGACCTGATAGCCTTTGTAGAGACCTCTCAAAAATAGCTACCCTCTC
CGGCATGAATTTATCAGCTAGAACGGTTGAATATCATATTGATGGTGATTTGACTGT
CTCCGGCCTTTCTCACCCGTTTGAATCTTTACCTACACATTACTCAGGCATTGCATTT
AAAATATATGAGGGTTCTAAAAATTTTTATCCTTGCGTTGAAATAAAGGCTTCTCCC
GCAAAAGTATTACAGGGTCATAATGTTTTTGGTACAACCGATTTAGCTTTATGCTCT
GAGGCTTTATTGCTTAATTTTGCTAATTCTTTGCCTTGCCTGTATGATTTATTGGATGT
TGGAATTCCTGATGCGGTATTTTCTCCTTACGCATCTGTGCGGTATTTCACACCGCAT
ATGGTGCACTCTCAGTACAATCTGCTCTGATGCCGCATAGTTAAGCCAGCCCCGACA
CCCGCCAACACCCGCTGACGCGCCCTGACGGGCTTGTCTGCTCCCGGCATCCGCTTA
CAGACAAGCTGTGACCGTCTCCGGGAGCTGCATGTGTCAGAGGTTTTCACCGTCATC
ACCGAAACGCGCGAGACGAAAGGGCCTCGTGATACGCCTATTTTTATAGGTTAATGT
CATGATAATAATGGTTTCTTAGACGTCAGGTGGCACTTTTCGGGGAAATGTGCGCGG
AACCCCTATTTGTTTATTTTTCTAAATACATTCAAATATGTATCCGCTCATGAGACAA
TAACCCTGATAAATGCTTCAATAATATTGAAAAAGGAAGAGTATGAGTATTCAACAT
TTCCGTGTCGCCCTTATTCCCTTTTTTGCGGCATTTTGCCTTCCTGTTTTTGCTCACCC
AGAAACGCTGGTGAAAGTAAAAGATGCTGAAGATCAGTTGGGTGCACGAGTGGGTT
ACATCGAACTGGATCTCAACAGCGGTAAGATCCTTGAGAGTTTTCGCCCCGAAGAAC
GTTTTCCAATGATGAGCACTTTTAAAGTTCTGCTATGTGGCGCGGTATTATCCCGTAT
TGACGCCGGGCAAGAGCAACTCGGTCGCCGCATACACTATTCTCAGAATGACTTGGT
TGAGTACTCACCAGTCACAGAAAAGCATCTTACGGATGGCATGACAGTAAGAGAAT
TATGCAGTGCTGCCATAACCATGAGTGATAACACTGCGGCCAACTTACTTCTGACAA
CGATCGGAGGACCGAAGGAGCTAACCGCTTTTTTGCACAACATGGGGGATCATGTA
ACTCGCCTTGATCGTTGGGAACCGGAGCTGAATGAAGCCATACCAAACGACGAGCG
TGACACCACGATGCCTGTAGCAATGGCAACAACGTTGCGCAAACTATTAACTGGCG
```

-continued

```
AACTACTTACTCTAGCTTCCCGGCAACAATTAATAGACTGGATGGAGGCGGATAAA
GTTGCAGGACCACTTCTGCGCTCGGCCCTTCCGGCTGGCTGGTTTATTGCTGATAAAT
CTGGAGCCGGTGAGCGTGGGTCTCGCGGTATCATTGCAGCACTGGGGCCAGATGGT
AAGCCCTCCCGTATCGTAGTTATCTACACGACGGGGAGTCAGGCAACTATGGATGA
ACGAAATAGACAGATCGCTGAGATAGGTGCCTCACTGATTAAGCATTGGTAACTGTC
AGACCAAGTTTACTCATATATACTTTAGATTGATTTAAAACTTCATTTTTAATTTAAA
AGGATCTAGGTGAAGATCCTTTTTGATAATCTCATGACCAAAATCCCTTAACGTGAG
TTTTCGTTCCACTGAGCGTCAGACCCCGTAGAAAAGATCAAAGGATCTTCTTGAGAT
CCTTTTTTTCTGCGCGTAATCTGCTGCTTGCAAACAAAAAAACCACCGCTACCAGCG
GTGGTTTGTTTGCCGGATCAAGAGCTACCAACTCTTTTTCCGAAGGTAACTGGCTTC
AGCAGAGCGCAGATACCAAATACTGTCCTTCTAGTGTAGCCGTAGTTAGGCCACCAC
TTCAAGAACTCTGTAGCACCGCCTACATACCTCGCTCTGCTAATCCTGTTACCAGTG
GCTGCTGCCAGTGGCGATAAGTCGTGTCTTACCGGGTTGGACTCAAGACGATAGTTA
CCGGATAAGGCGCAGCGGTCGGGCTGAACGGGGGGTTCGTGCACACAGCCCAGCTT
GGAGCGAACGACCTACACCGAACTGAGATACCTACAGCGTGAGCTATGAGAAAGCG
CCACGCTTCCCGAAGGGAGAAAGGCGGACAGGTATCCGGTAAGCGGCAGGGTCGG
AACAGGAGAGCGCACGAGGGAGCTTCCAGGGGGAAACGCCTGGTATCTTTATAGTC
CTGTCGGGTTTCGCCACCTCTGACTTGAGCGTCGATTTTTGTGATGCTCGTCAGGGGG
GCGGAGCCTATGGAAAAACGCCAGCAACGCGGCCTTTTTACGGTTCCTGGCCTTTTG
CTGGCCTTTTGCTCACATGTTCTTTCCTGCGTTATCCCCTGATTCTGTGGATAACCGT
ATTACCGCCTTTGAGTGAGCTGATACCGCTCGCCGCAGCCGAACGACCGAGCGCAG
CGAGTCAGTGAGCGAGGAAGCGGAAGAGCGCCCAATACGCAAACCGCCTCTCCCCG
CGCGTTGGCCGATTCATTAATGCAGCAGCTGCGCGCTCGCTCGCTCACTGAGGCCGC
CCGGGCAAAGCCCGGGCGTCGGGCGACCTTTGGTCGCCCGGCCTCAGTGAGCGAGC
GAGCGCGCAGAGAGGGAGTGGCCAACTCCATCACTAGGGGTTCCTTGTAGTTAATG
ATTAACCCGCCATGCTACTTATCTACGTAGCCATGCTCTAGGACATTGATTATTGACT
AGTGGAGTTCCGCGTTACATAACTTACGGTAAATGGCCCGCCTGGCTGACCGCCCAA
CGACCCCCGCCCATTGACGTCAATAATGACGTATGTTCCCATAGTAACGCCAATAGG
GACTTTCCATTGACGTCAATGGGTGGAGTATTTACGGTAAACTGCCCACTTGGCAGT
ACATCAAGTGTATCATATGCCAAGTACGCCCCCTATTGACGTCAATGACGGTAAATG
GCCCGCCTGGCATTATGCCCAGTACATGACCTTATGGGACTTTCCTACTTGGCAGTA
CATCTACGTATTAGTCATCGCTATTACCATGGTCGAGGTGAGCCCCACGTTCTGCTTC
ACTCTCCCCATCTCCCCCCCCTCCCCACCCCCAATTTTGTATTTATTTATTTTTTAATT
ATTTTGTGCAGCGATGGGGGCGGGGGGGGGGGGGCGCGCGCCAGGCGGGGCGG
GGCGGGGCGAGGGGGGGCGGGGCGAGGCGGAGAGGTGCGGCGGCAGCCAATCA
GAGCGGCGCGCTCCGAAAGTTTCCTTTTATGGCGAGGCGGCGGCGGCGGCGGCCCT
ATAAAAAGCGAAGCGCGCGGCGGGCGGGAGTCGCTGCGCGCTGCCTTCGCCCCGTG
CCCCGCTCCGCCGCCGCCTCGCGCCGCCCGCCCCGGCTCTGACTGACCGCGTTACTA
AAACAGGTAAGTCCGGCCTCCGCGCCGGGTTTTGGCGCCTCCCGCGGGCGCCCCCCT
CCTCACGGCGAGCGCTGCCACGTCAGACGAAGGGCGCAGCGAGCGTCCTGATCCTT
CCGCCCGGACGCTCAGGACAGCGGCCCGCTGCTCATAAGACTCGGCCTTAGAACCC
```

-continued

CAGTATCAGCAGAAGGACATTTTAGGACGGGACTTGGGTGACTCTAGGGCACTGGT

TTTCTTTCCAGAGAGCGGAACAGGCGAGGAAAAGTAGTCCCTTCTCGGCGATTCTGC

GGAGGGATCTCCGTGGGGCGGTGAACGCCGATGATGCCTCTACTAACCATGTTCATG

TTTTCTTTTTTTTCTACAGGTCCTGGGTGACGAACAGGGTACCGCCACC 3'

SEQ ID NO. 2 (miRNA expression cassette No. 2 - SGLT-2):
5'

ATGGCCACCGGCTCTCGCACAAGCCTGCTGCTGGCTTTCGGACTGCTGTGCCTGCCT

TGGCTCCAGGAGGGCTCCGCCGCTAGCATCGATACCGTCGCTATGTGCTGGAGGCTT

GCTGAAGGCTGTATGCTGATACTGCGGCATGTGGTAATCACGTTTTGGCCTCTGACT

GACGTGATTACCATGCCGCAGTATCAGGACACAAGGCCTGTTACTAGCACTCACATG

GAACAAATGGCCTCTAGCCTGGAGGCTTGCTGAAGGCTGTATGCTGGCGCTGGGCTG

ATGAACATTTATGTTTTGGCCTCTGACTGACGCGCTGGGCTGGAACATTTATCAGGA

CACAAGGCCTGTTACTAGCACTCACATGGAACAAATGGCCTCTAGCCTGGAGGCTTG

CTGAAGGCTGTATGCTGTCATGAAACGCAAATAGCCCATCGTTTTGGCCTCTGACTG

ACGATGGGCTATGCGTTTCATGACAGGACACAAGGCCTGTTACTAGCACTCACATGG

AACAAATGGCCTC

3'

SEQ ID NO: 3 = SEQ ID NO: 1 + SEQ ID NO: 2
5'

ATAATCAACCTCTGGATTACAAAATTTGTGAAAGATTGACTGGTATTCTTAACTATG

TTGCTCCTTTTACGCTATGTGGATACGCTGCTTTAATGCCTTTGTATCATGCTATTGCT

TCCCGTATGGCTTTCATTTTCTCCTCCTTGTATAAATCCTGGTTGCTGTCTCTTTATGA

GGAGTTGTGGCCCGTTGTCAGGCAACGTGGCGTGGTGTGCACTGTGTTTGCTGACGC

AACCCCCACTGGTTGGGGCATTGCCACCACCTGTCAGCTCCTTTCCGGGACTTTCGC

TTTCCCCCTCCCTATTGCCACGGCGGAACTCATCGCCGCCTGCCTTGCCCGCTGCTGG

ACAGGGGCTCGGCTGTTGGGCACTGACAATTCCGTGGTGTTGTCGGGGAAATCATCG

TCCTTTCCTTGGCTGCTCGCCTGTGTTGCCACCTGGATTCTGCGCGGGACGTCCTTCT

GCTACGTCCCTTCGGCCCTCAATCCAGCGGACCTTCCTTCCCGCGGCCTGCTGCCGG

CTCTGCGGCCTCTTCCGCGTCTTCGCCTTCGCCCTCAGACGAGTCGGATCTCCCTTTG

GGCCGCCTCCCCGCCTAAGCTTATCGATACCGTCGAGATCTAACTTGTTTATTGCAG

CTTATAATGGTTACAAATAAAGCAATAGCATCACAAATTTCACAAATAAAGCATTTT

TTTCACTGCATTCTAGTTGTGGTTTGTCCAAACTCATCAATGTATCTTATCATGTCTG

GATCTCGACCTCGACTAGAGCATGGCTACGTAGATAAGTAGCATGGCGGGTTAATC

ATTAACTACAAGGAACCCCTAGTGATGGAGTTGGCCACTCCCTCTCTGCGCGCTCGC

TCGCTCACTGAGGCCGGGCGACCAAAGGTCGCCCGACGCCCGGGCTTTGCCCGGGC

GGCCTCAGTGAGCGAGCGAGCGCGCAGCTGGCGTAATAGCGAAGAGGCCCGCACCG

ATCGCCCTTCCCAACAGTTGCGCAGCCTGAATGGCGAATGGCGATTCCGTTGCAATG

GCTGGCGGTAATATTGTTCTGGATATTACCAGCAAGGCCGATAGTTTGAGTTCTTCT

ACTCAGGCAAGTGATGTTATTACTAATCAAAGAAGTATTGCGACAACGGTTAATTTG

CGTGATGGACAGACTCTTTTACTCGGTGGCCTCACTGATTATAAAAACACTTCTCAG

GATTCTGGCGTACCGTTCCTGTCTAAAATCCCTTTAATCGGCCTCCTGTTTAGCTCCC

-continued

```
GCTCTGATTCTAACGAGGAAAGCACGTTATACGTGCTCGTCAAAGCAACCATAGTAC
GCGCCCTGTAGCGGCGCATTAAGCGCGGCGGGTGTGGTGGTTACGCGCAGCGTGAC
CGCTACACTTGCCAGCGCCCTAGCGCCCGCTCCTTTCGCTTTCTTCCCTTCCTTTCTC
GCCACGTTCGCCGGCTTTCCCCGTCAAGCTCTAAATCGGGGGCTCCCTTTAGGGTTC
CGATTTAGTGCTTTACGGCACCTCGACCCCAAAAAACTTGATTAGGGTGATGGTTCA
CGTAGTGGGCCATCGCCCTGATAGACGGTTTTTCGCCCTTTGACGTTGGAGTCCACG
TTCTTTAATAGTGGACTCTTGTTCCAAACTGGAACAACACTCAACCCTATCTCGGTCT
ATTCTTTTGATTTATAAGGGATTTTGCCGATTTCGGCCTATTGGTTAAAAAATGAGCT
GATTTAACAAAAATTTAACGCGAATTTTAACAAAATATTAACGTTTACAATTTAAAT
ATTTGCTTATACAATCTTCCTGTTTTTGGGGCTTTTCTGATTATCAACCGGGGTACAT
ATGATTGACATGCTAGTTTTACGATTACCGTTCATCGATTCTCTTGTTTGCTCCAGAC
TCTCAGGCAATGACCTGATAGCCTTTGTAGAGACCTCTCAAAAATAGCTACCCTCTC
CGGCATGAATTTATCAGCTAGAACGGTTGAATATCATATTGATGGTGATTTGACTGT
CTCCGGCCTTTCTCACCCGTTTGAATCTTTACCTACACATTACTCAGGCATTGCATTT
AAAATATATGAGGGTTCTAAAAATTTTTATCCTTGCGTTGAAATAAAGGCTTCTCCC
GCAAAAGTATTACAGGGTCATAATGTTTTTGGTACAACCGATTTAGCTTTATGCTCT
GAGGCTTTATTGCTTAATTTTGCTAATTCTTTGCCTTGCCTGTATGATTTATTGGATGT
TGGAATTCCTGATGCGGTATTTTCTCCTTACGCATCTGTGCGGTATTTCACACCGCAT
ATGGTGCACTCTCAGTACAATCTGCTCTGATGCCGCATAGTTAAGCCAGCCCCGACA
CCCGCCAACACCCGCTGACGCGCCCTGACGGGCTTGTCTGCTCCCGGCATCCGCTTA
CAGACAAGCTGTGACCGTCTCCGGGAGCTGCATGTGTCAGAGGTTTTCACCGTCATC
ACCGAAACGCGCGAGACGAAAGGGCCTCGTGATACGCCTATTTTTATAGGTTAATGT
CATGATAATAATGGTTTCTTAGACGTCAGGTGGCACTTTTCGGGGAAATGTGCGCGG
AACCCCTATTTGTTTATTTTTCTAAATACATTCAAATATGTATCCGCTCATGAGACAA
TAACCCTGATAAATGCTTCAATAATATTGAAAAAGGAAGAGTATGAGTATTCAACAT
TTCCGTGTCGCCCTTATTCCCTTTTTTGCGGCATTTTGCCTTCCTGTTTTTGCTCACCC
AGAAACGCTGGTGAAAGTAAAAGATGCTGAAGATCAGTTGGGTGCACGAGTGGGTT
ACATCGAACTGGATCTCAACAGCGGTAAGATCCTTGAGAGTTTTCGCCCCGAAGAAC
GTTTTCCAATGATGAGCACTTTTAAAGTTCTGCTATGTGGCGCGGTATTATCCCGTAT
TGACGCCGGGCAAGAGCAACTCGGTCGCCGCATACACTATTCTCAGAATGACTTGGT
TGAGTACTCACCAGTCACAGAAAAGCATCTTACGGATGGCATGACAGTAAGAGAAT
TATGCAGTGCTGCCATAACCATGAGTGATAACACTGCGGCCAACTTACTTCTGACAA
CGATCGGAGGACCGAAGGAGCTAACCGCTTTTTTGCACAACATGGGGGATCATGTA
ACTCGCCTTGATCGTTGGGAACCGGAGCTGAATGAAGCCATACCAAACGACGAGCG
TGACACCACGATGCCTGTAGCAATGGCAACAACGTTGCGCAAACTATTAACTGGCG
AACTACTTACTCTAGCTTCCCGGCAACAATTAATAGACTGGATGGAGGCGGATAAA
GTTGCAGGACCACTTCTGCGCTCGGCCCTTCCGGCTGGCTGGTTTATTGCTGATAAAT
CTGGAGCCGGTGAGCGTGGGTCTCGCGGTATCATTGCAGCACTGGGGCCAGATGGT
AAGCCCTCCCGTATCGTAGTTATCTACACGACGGGGAGTCAGGCAACTATGGATGA
ACGAAATAGACAGATCGCTGAGATAGGTGCCTCACTGATTAAGCATTGGTAACTGTC
AGACCAAGTTTACTCATATATACTTTAGATTGATTTAAAACTTCATTTTTAATTTAAA
```

```
AGGATCTAGGTGAAGATCCTTTTTGATAATCTCATGACCAAAATCCCTTAACGTGAG

TTTTCGTTCCACTGAGCGTCAGACCCCGTAGAAAAGATCAAAGGATCTTCTTGAGAT

CCTTTTTTTCTGCGCGTAATCTGCTGCTTGCAAACAAAAAAACCACCGCTACCAGCG

GTGGTTTGTTTGCCGGATCAAGAGCTACCAACTCTTTTTCCGAAGGTAACTGGCTTC

AGCAGAGCGCAGATACCAAATACTGTCCTTCTAGTGTAGCCGTAGTTAGGCCACCAC

TTCAAGAACTCTGTAGCACCGCCTACATACCTCGCTCTGCTAATCCTGTTACCAGTG

GCTGCTGCCAGTGGCGATAAGTCGTGTCTTACCGGGTTGGACTCAAGACGATAGTTA

CCGGATAAGGCGCAGCGGTCGGGCTGAACGGGGGGTTCGTGCACACAGCCCAGCTT

GGAGCGAACGACCTACACCGAACTGAGATACCTACAGCGTGAGCTATGAGAAAGCG

CCACGCTTCCCGAAGGGAGAAAGGCGGACAGGTATCCGGTAAGCGGCAGGGTCGG

AACAGGAGAGCGCACGAGGGAGCTTCCAGGGGAAACGCCTGGTATCTTTATAGTC

CTGTCGGGTTTCGCCACCTCTGACTTGAGCGTCGATTTTGTGATGCTCGTCAGGGGG

GCGGAGCCTATGGAAAAACGCCAGCAACGCGGCCTTTTTACGGTTCCTGGCCTTTTG

CTGGCCTTTTGCTCACATGTTCTTTCCTGCGTTATCCCCTGATTCTGTGGATAACCGT

ATTACCGCCTTTGAGTGAGCTGATACCGCTCGCCGCAGCCGAACGACCGAGCGCAG

CGAGTCAGTGAGCGAGGAAGCGGAAGAGCGCCCAATACGCAAACCGCCTCTCCCCG

CGCGTTGGCCGATTCATTAATGCAGCAGCTGCGCGCTCGCTCGCTCACTGAGGCCGC

CCGGGCAAAGCCCGGGCGTCGGGCGACCTTTGGTCGCCCGGCCTCAGTGAGCGAGC

GAGCGCGCAGAGAGGGAGTGGCCAACTCCATCACTAGGGGTTCCTTGTAGTTAATG

ATTAACCCGCCATGCTACTTATCTACGTAGCCATGCTCTAGGACATTGATTATTGACT

AGTGGAGTTCCGCGTTACATAACTTACGGTAAATGGCCCGCCTGGCTGACCGCCCAA

CGACCCCCGCCCATTGACGTCAATAATGACGTATGTTCCCATAGTAACGCCAATAGG

GACTTTCCATTGACGTCAATGGGTGGAGTATTTACGGTAAACTGCCCACTTGGCAGT

ACATCAAGTGTATCATATGCCAAGTACGCCCCCTATTGACGTCAATGACGGTAAATG

GCCCGCCTGGCATTATGCCCAGTACATGACCTTATGGGACTTTCCTACTTGGCAGTA

CATCTACGTATTAGTCATCGCTATTACCATGGTCGAGGTGAGCCCCACGTTCTGCTTC

ACTCTCCCCATCTCCCCCCCCTCCCCACCCCCAATTTTGTATTTATTTATTTTTTAATT

ATTTTGTGCAGCGATGGGGGGGGGGGGGGGGGCGCGCGCCAGGCGGGGCGG

GGCGGGGCGAGGGGCGGGCGGGGCGAGGCGGAGAGGTGCGGCGGCAGCCAATCA

GAGCGGCGCGCTCCGAAAGTTTCCTTTTATGGCGAGGCGGCGGCGGCGGCGGCCCT

ATAAAAAGCGAAGCGCGCGGCGGGCGGGAGTCGCTGCGCGCTGCCTTCGCCCCGTG

CCCCGCTCCGCCGCCGCCTCGCGCCGCCCGCCCCGGCTCTGACTGACCGCGTTACTA

AAACAGGTAAGTCCGGCCTCCGCGCCGGGTTTTGGCGCCTCCCGCGGGCGCCCCCCT

CCTCACGGCGAGCGCTGCCACGTCAGACGAAGGGCGCAGCGAGCGTCCTGATCCTT

CCGCCCGGACGCTCAGGACAGCGGCCCGCTGCTCATAAGACTCGGCCTTAGAACCC

CAGTATCAGCAGAAGGACATTTTAGGACGGGACTTGGGTGACTCTAGGGCACTGGT

TTTCTTTCCAGAGAGCGGAACAGGCGAGGAAAAGTAGTCCCTTCTCGGCGATTCTGC

GGAGGGATCTCCGTGGGCGGTGAACGCCGATGATGCCTCTACTAACCATGTTCATG

TTTTCTTTTTTTTCTACAGGTCCTGGGTGACGAACAGGGTACCGCCACCATGGCCAC

CGGCTCTCGCACAAGCCTGCTGCTGGCTTTCGGACTGCTGTGCCTGCCTTGGCTCCA
```

```
                           -continued
GGAGGGCTCCGCCGCTAGCATCGATACCGTCGCTATGTGCTGGAGGCTTGCTGAAGG

CTGTATGCTGATACTGCGGCATGTGGTAATCACGTTTTGGCCTCTGACTGACGTGATT

ACCATGCCGCAGTATCAGGACACAAGGCCTGTTACTAGCACTCACATGGAACAAAT

GGCCTCTAGCCTGGAGGCTTGCTGAAGGCTGTATGCTGGCGCTGGGCTGATGAACAT

TTATGTTTTGGCCTCTGACTGACGCGCTGGGCTGGAACATTTATCAGGACACAAGGC

CTGTTACTAGCACTCACATGGAACAAATGGCCTCTAGCCTGGAGGCTTGCTGAAGGC

TGTATGCTGTCATGAAACGCAAATAGCCCATCGTTTTGGCCTCTGACTGACGATGGG

CTATGCGTTTCATGACAGGACACAAGGCCTGTTACTAGCACTCACATGGAACAAATG

GCCTC 3'
```

As will be appreciated by those skilled in the art, because the recombinant plasmid is a circular vector, the one or more sequences of the miRNA expression cassettes may be connected at the 3' end of SEQ ID NO. 1, as shown in SEQ ID NO. 3, or at the 5' end of SEQ ID NO. 1.

As will be appreciated by those skilled in the art, a perfect match of nucleotides with each of the miRNA expression cassette sequences is not necessary in order to have the desired result of decreased bioavailability of the target biomolecule as a result of the target cell producing the miRNA sequence that will bind to and degrade the mRNA of the target biomolecule. In some embodiments of the present disclosure, about 80% to about 100% nucleotide sequence matching with each of the miRNA expression cassettes causes the desired result. In some embodiments of the present disclosure, about 85% to about 100% nucleotide sequence matching with each of the miRNA expression cassettes causes the desired result. In some embodiments of the present disclosure, about 90% to about 100% nucleotide sequence matching with each of the miRNA expression cassettes causes the desired result. In some embodiments of the present disclosure, about 95% to about 100% nucleotide sequence matching with each of the miRNA expression cassettes causes the desired result.

Example 1—Expression Cassette

Expression cassettes for expressing miRNA were synthesized. The synthesized miRNA expression cassettes were cloned into the pAVA-00200 plasmid backbone containing the CASI promoter, multiple cloning site (MCS), Woodchuck Hepatitis Virus post-transcriptional regulatory element (WPRE), and Simian virus 40 (SV40) polyadenylation (polyA) sequence, all flanked by the AAV2 inverted terminal repeats (ITR). pAVA-00200 was cut with the restriction enzymes KpnI and XbaI in the MCS and separated on a 1% agarose gel. The band of interest was excised and purified using a gel extraction kit. Each miRNA expression cassette was amplified by polymerase chain reaction (PCR) using Taq polymerase and the PCR products were gel purified and the bands on interest were also excised and purified using a gel extraction kit. These PCR products contained the miRNA expression cassettes in addition to 15 base pair 5' and 3' overhangs that aligned with the ends of the linearized pAVA-00200 backbone. Using in-fusion cloning, the amplified miRNA expression cassettes are integrated with the pAVA-00200 backbone via homologous recombination. The resulting RP contained the following: 5' ITR, CASI promoter, miRNA expression cassette, WPRE, SV40 polyA and ITR 3'.

The invention claimed is:

1. A composition that comprises a recombinant plasmid (RP) comprising a sequence of nucleotides that is 100% identical to SEQ ID NO. 2.

2. A composition that comprises a recombinant plasmid (RP) comprising a sequence of nucleotides that is 100% identical to SEQ ID NO. 3.

3. The composition of claim 1, wherein the RP is encased in a protein coat, a lipid vesicle, or any combination thereof.

* * * * *